Figure 1:
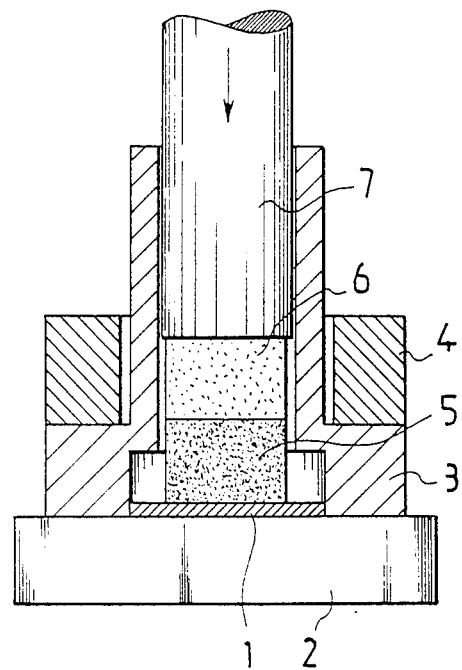

United States Patent [19]

Tapanainen

[11] Patent Number: 4,632,797
[45] Date of Patent: Dec. 30, 1986

[54] PROCEDURE FOR MANUFACTURING A BRAKE BLOCK

[76] Inventor: Matti Tapanainen, Laanitie 6 B, 72600 Keitele, Finland

[21] Appl. No.: 548,862

[22] PCT Filed: Jan. 25, 1983

[86] PCT No.: PCT/FI83/00005
§ 371 Date: Sep. 23, 1983
§ 102(e) Date: Sep. 23, 1983

[87] PCT Pub. No.: WO83/02651
PCT Pub. Date: Aug. 4, 1983

[30] Foreign Application Priority Data

Jan. 16, 1982 [FI] Finland .................................. 820248

[51] Int. Cl.[4] ............................................. B29C 43/20
[52] U.S. Cl. ................................ 264/260; 188/251 A; 264/60
[58] Field of Search ........................... 264/260, 113, 60; 188/251 A, 251 M; 51/293, 297, 307

[56] References Cited

U.S. PATENT DOCUMENTS 1,891,723  12/1932  Novak ............................. 188/251 A

FOREIGN PATENT DOCUMENTS 2218757  8/1982  Fed. Rep. of Germany ... 188/251 A
0061556  4/1982  Finland .
2452033  10/1980  France .
0018827  1/1982  Japan .............................. 188/251 A

*Primary Examiner*—Donald Czaja
*Assistant Examiner*—Hubert C. Lorin

[57] ABSTRACT

A procedure for manufacturing a brake block comprising a body (1) and a friction bit (5,6), wherein the friction bit is pressed fast to the body (1) with the aid of heat effect so that the central region (6) of the friction bit will be softer than the margins (5) of the friction bit. The friction bit is pressed so that upon the body (1) are placed two friction material courses (5,6) of different hardness material, the harder friction material against the body, whereafter the materials are pressed together and at the same time are pressed fast to the body in such manner that the harder friction material is freely allowed to flow into a widening in the lower part of the press. The harder friction material placed against the body will spread to the margins, whereby a friction bit is obtained which has a friction surface (6) with desired friction coefficient and harder margins (5), by which is prevented the ingress of abrasive foreign bodies in between the friction surface and the brake disk.

2 Claims, 2 Drawing Figures

PROCEDURE FOR MANUFACTURING A BRAKE BLOCK

The present invention concerns a procedure for manufacturing a brake block comprising a body and a friction bit, in said procedure the friction bit being pressed fast to the body with the aid of heat effect so that the central part of the friction bit will be softer than the margins of the friction bit.

A brake block manufacturing procedure like this has for instance been disclosed in applicant's Finnish patent No. 61556 of Aug. 10, 1982. The object of the invention is to develop this manufacturing procedure further. The procedure of the present invention is characterized in that the friction bit is pressed so that upon the body are placed two friction material layers of different hardness, the harder friction material against the body, whereafter the materials are pressed together and at the same time fast to the body so that the harder friction material is allowed freely to flow out into a widening in the lower part of the press. It is possible with the aid of the invention to preselect suitable hardnesses of the friction bit materials and it is not necessary to leave the central region half-cured, as is the case in the process of Finnish Pat. No. 61556. The harder friction material, placed against the body, spreads to the edges, is melted by the heat coming from below, as the softer friction material thereupon is being pressed downwardly from straight above into the center of the friction bit. The materials fuse together and to the body so that a friction bit is obtained which has a friction surface with desired friction coefficient, and harder margins, whereby is prevented the access of abrasive foreign matter to the space between the friction surface and the brake disk.

An advantageous embodiment of the invention is characterized in that the different friction material layers are pre-pressed to form two coherent pieces, before they are placed one on top of the other upon the body for the final pressing operation. Hereby the friction material layers are conveniently and swiftly introducible into the press in which the final pressing is accomplished.

The invention is described in the following with the aid of an example, with reference to the attached drawing, wherein FIG. 1 presents the brake block before the final pressing, with the press presented in section.

Figure 2:
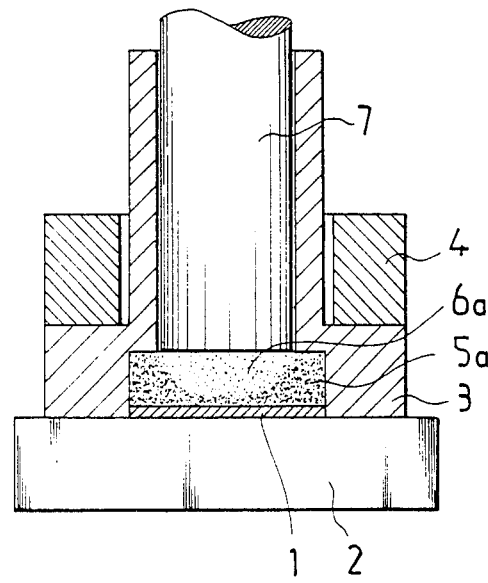

FIG. 2 shows the same as FIG. 1, but after the final pressing.

The body 1 of the brake block is placed on the hot plate 2, and upon the body is fitted the mould 3. The mould 3 has a heater element 4 on its outer circumference. Through the opening of the mould 3, two pre-pressed friction material pieces 5,6 are dropped to lie one on top of the other upon the body 1, namely, first a piece 5 pre-pressed of harder friction material and on top of this, a piece 6 pre-pressed or softer friction material and having a higher friction coefficient. The friction material pieces 5,6 are pressed together and fast to the body 1 by the plunger 7. In this connection, the piece 5 which abuts on the body 1 will spread to the sides, by action of the heat coming from below, as the piece 6 lying thereupon is pressed straight downwardly from above into the center of the piece. Hereby a brake block is obtained which has a friction surface $6a$ with desired friction coefficient and harder margins $5a$, by which is prevented the ingress of abrasive foreign bodies into the space between the friction surface and the brake disk.

It is obvious to a person skilled in the art that different embodiments of the invention may vary within the scope of the claims stated below.

I claim:

1. A method of manufacturing a brake block having a brake block body, comprising the steps of: placing the brake block body in a mold having a cavity of a certain width and height; placing on said body a first layer of a friction material of a certain hardness, of a width smaller than that of said cavity so as to leave a space laterally thereof, and of a height greater than that of said cavity; placing on said first layer a second layer of a friction material of a lower hardness than that of said first layer and of a width substantially corresponding to that of said first layer; and applying pressure and heat on said first and second layers in such a manner that the first layer will flow outwardly into and substantially fill the space to form a relatively hard margin of the brake block and will adhere to said brake body, and the second layer will partially flow into a central portion only of the first layer to form a relatively soft friction surface of the brake block surrounded by the relatively hard margin.

2. A method according to claim 1, wherein said first and second layers are pre-pressed coherent bodies prior to being placed in the mold.

* * * * *